United States Patent [19]

Urban et al.

[11] Patent Number: 5,693,712

[45] Date of Patent: Dec. 2, 1997

[54] SILICA FILLED RUBBERY VULCANIZATES

[75] Inventors: Paul Carl Urban; Walter Von Hellens, both of Bright's Grove, Canada

[73] Assignee: Bayer Inc., Sarnia, Canada

[21] Appl. No.: 564,835

[22] Filed: Nov. 29, 1995

Related U.S. Application Data

[63] Continuation of Ser. No. 223,790, Apr. 6, 1994, abandoned.

[51] Int. Cl.[6] .................... C08L 9/00; C08K 3/36; C08K 3/04

[52] U.S. Cl. .................. 525/98; 524/393; 524/504

[58] Field of Search .................... 524/393, 504; 525/98

[56] References Cited

U.S. PATENT DOCUMENTS

| | | | |
|---|---|---|---|
| 4,820,751 | 4/1989 | Takeshita et al. | 523/215 |
| 5,225,011 | 7/1993 | Takino et al. | 152/209 R |
| 5,226,987 | 7/1993 | Matsumoto et al. | 152/209 R |
| 5,227,425 | 7/1993 | Rauline | 524/493 |
| 5,237,015 | 8/1993 | Urban | 525/316 |

*Primary Examiner*—Irina S. Zemel
*Attorney, Agent, or Firm*—Joseph C. Gil; Noland J. Cheung

[57] ABSTRACT

A process is provided for making improved rubbery vulcanizates wherein rubbery polymer is mixed with silica or silica and carbon black, polyfunctional polysulphide silane compound and sulphur-based vulcanizaiton agents and the mixture is vulcanized, the rubber polymer is a polymer having two or three domains or a mixture of a polymer having two or three domains and one of polybutadiene, styrene-butadiene polymer or natural rubber or a mixture of polybutadiene and natural rubber.

8 Claims, No Drawings

1

SILICA FILLED RUBBERY VULCANIZATES

This application is a continuation of application Ser. No. 08/223,790 filed Apr. 6, 1994 now abandoned.

FIELD OF THE INVENTION

This invention relates to an improved process for making a filled rubbery vulcanizate having an improved balance of properties.

BACKGROUND OF THE INVENTION

Rubbery vulcanizates require the presence of fillers in order to possess the strength characteristics necessary for the majority of end uses. Carbon black, in its various forms, is a well known filler and provides a wide range of characteristics when used as the filler in vulcanizates. Silica, as a fine particle size material, is also a fairly well known filler but is not used very extensively in vulcanizates. In tire applications, silica has only recently been considered as a potential filler for rubbery vulcanizates and mixtures of carbon black and silica have also only recently been considered as potential fillers. A tire for automotive use has to have a balance of properties over a wide temperature range, the properties including high abrasion resistance, low rolling resistance and good skid resistance.

DESCRIPTION OF PRIOR ART

U.S. Pat. No. 4,820,751 teaches rubbery compositions for use in tires which comprise the use of a particular type of carbon black and, optionally, silica as fillers and a defined silane coupling agent. Such a specific type of carbon black is not readily commercially available at competitive costs. U.S. Pat. No. 5,225,011 teaches a tire having different compositions for the side and centre portions of the tire tread, the centre portion comprising a particular type of carbon black, silica and a defined silane coupling agent. The manufacture of a tire having such a complex assembly process is not commercially acceptable. U.S. Pat. No. 5,226,987 teaches a tire for heavy load vehicles in which there is, beneath the tread section, a rubber reinforcing layer which comprises carbon black, silica, a resorcin or resorcin derivative and a melamine derivative. U.S. Pat. No. 5,227,425 teaches a tire tread formed by a process comprising thermomechanically working a rubbery polymer with a filler, a major portion of which is silica having specific property characteristics, followed by adding a vulcanization system and vulcanizing the whole. U.S. Pat. No. 5,237,015 teaches rubbery polymers which may be used in tire treads characterized in that the polymer comprises from 2 to 6 domains, each domain having specific composition and molecular weight characteristics.

SUMMARY OF THE INVENTION

It is an objective of this invention to provide a process for making a rubbery vulcanizate having an improved balance of properties. Suitable use for such vulcanizates is the tread of an automotive tire.

Accordingly, the present invention provides a process for making a rubbery vulcanizate having an improved balance of properties which process comprises preparing a mixture comprising rubbery polymer, filler selected from silica and from silica and carbon black, a polyfunctional polysulphide silane compound and sulphur-based vulcanization agents, shaping said mixture and vulcanizing the shaped mixture by heating, wherein said rubbery polymer is selected from a polymer having two or three domains and from a mixture containing per 100 parts by weight from about 20 to about 85 parts by weight of a polymer having two or three domains and from about 15 to about 80 parts by weight of a polymer selected from polybutadiene having a cis-1,4 content of from 90 to about 99 weight percent, a styrene-butadiene polymer having from about 17 to about 25 weight percent of bound styrene, natural rubber, or a mixture of said polybutadiene and a minor proportion of natural rubber, said polymer having two or three domains comprising for the two domain polymer from about 5 to about 30 weight percent of acrylonitrile, from about 5 to about 40 weight percent of styrene and from about 55 to about 85 weight percent of butadiene and wherein one domain forms from about 10 to about 70 weight percent of the polymer and comprises from about 5 to about 45 weight percent of acrylonitrile, from about 5 to about 50 weight percent of styrene and from about 50 to about 75 weight percent of butadiene and wherein a second domain forms from about 30 to about 90 weight percent of the polymer and comprises from about 10 to about 45 weight percent of acrylonitrile, from 0 to about 50 weight percent of styrene and from about 50 to 90 weight percent of butadiene and for the three domain polymer from about 5 to about 20 weight percent of acrylonitrile, from about 5 to about 30 weight percent of styrene and from about 50 to about 80 weight percent of butadiene and wherein one domain forms from about 5 to about 25 weight percent of the polymer and comprises from about 10 to about 45 weight percent of acrylonitrile, from 0 to about 30 weight percent of styrene and about 40 to about 60 weight percent of butadiene, a second domain forms from about 30 to about 70 weight percent of the polymer and comprises from 0 to about 10 weight percent of acrylonitrile, from 0 to about 15 weight percent of styrene and from about 80 to about 95 weight percent of butadiene, and a third domain forms from about 5 to about 65 weight percent of the polymer and comprises from 0 to about 20 weight percent of acrylonitrile, from about 5 to about 45 weight percent of styrene and from about 55 to about 80 weight percent of butadiene, wherein the quantity of filler per 100 parts by weight of rubbery polymer is from about 30 to about 75 parts by weight of silica or from about 10 to 60 parts by weight of silica plus from about 10 to 60 parts by weight of carbon black the total amount of silica plus carbon black not being more than 75 parts by weight and the weight ratio of silica to carbon black being within the range of 1 to 4 to 6 to 1.

DETAILED DESCRIPTION OF THE INVENTION

The combination of the polymer having two or three domains and silica surprisingly provides in the vulcanizates an improved balance of properties.

The rubbery polymer is selected from a polymer having two or three domains and form from a mixture containing per 100 parts by weight from about 20 to about 85 parts by weight of a polymer having two or three domains and from about 15 to about 80 parts by weight of a polymer selected from polybutadiene having a cis-1,4 content of from 90 to about 99 weight percent, a styrene-butadiene polymer having from about 17 to about 25 weight percent of bound styrene, natural rubber, or a mixture of said polybutadiene and a minor proportion of natural rubber. Such polybutadiene is well known and is commercially available from a number of sources. Preferably the cis-1,4 content of the polybutadiene is from about 97 to about 99 weight percent, such polybutadienes being produced by the cobalt salt—aluminum alkyl catalyst or by the neodymium salt— aluminum alkyl catalyst system. Such styrene-butadiene polymers are well known and may be prepared by emulsion or solution polymerization. Preferably, the styrene-butadiene polymer contains from about 21 to about 25 weight percent of bound styrene. Natural rubber is well known. A mixture of said polybutadiene and natural rubber generally contains from about 10 to about 40 parts by weight of natural rubber per 100 parts by weight of the mixture of polybutadiene and natural rubber. Preferably the rubbery polymer is a mixture containing per 100 parts by weight from about 30 to about 50 parts by weight of a polymer having two or three domains and from about 50 to about 70 parts by weight of polybutadiene or a mixture of polybutadiene and natural rubber wherein the natural rubber forms about 10 to about 30 weight percent of the mixture of polybutadiene and natural rubber.

The polymer having two or three domains may be prepared by the process described in U.S. Pat. No. 5,237,015. Preferably the amount of such polymer when mixed with polybutadiene is from about 75 to about 85 parts by weight. Such a polymer having two or three domains has certain characteristics. By domain is meant a region in or on a polymer particle which is chemically different from an adjacent region and there may be instances where there is no clear dividing line between the composition of one domain and another domain but the transition may be gradual. Nevertheless, the polymer does have chemically different domains. For a polymer having two domains, the overall polymer composition is from about 5 to about 30 weight percent of acrylonitrile, from about 5 to about 40 weight percent of styrene and from about 55 to about 85 weight percent of butadiene. Preferably such a polymer has an overall composition of from about 10 to about 25 weight percent of acrylonitrile, from about 5 to about 25 weight percent of styrene and from about 65 to about 80 weight percent of butadiene. In such a two domain polymer, one domain forms from about 10 to about 70, preferably from about 15 to about 50 weight percent of the polymer and comprises from about 5 to about 45 weight percent acrylonitrile, from about 5 to about 50 weight percent of styrene and from about 50 to about 75 weight percent of butadiene, preferably from about 15 to about 45 weight percent of acrylonitrile, from about 5 to about 30 weight percent of styrene and from about 55 to 65 weight percent of butadiene. The second domain forms about 30 to about 90 preferably from about 50 to about 85 weight percent of the polymer and comprises from about 10 to about 45 weight percent of acrylonitrile, from 0 to about 50 weight percent of styrene and from about 50 to about 90 weight percent of butadiene, preferably from about 10 to about 30 weight percent of acrylonitrile, from 0 to about 30 weight percent of styrene and from about 55 to about 80 weight percent of butadiene. For a polymer having three domains, the overall polymer composition is from about 5 to about 20 weight percent of acrylonitrile, from about 5 to about 30 weight percent of styrene and from about 50 to about 80 weight percent of butadiene, preferably from about 8 to about 15 weight percent of acrylonitrile, from about 10 to about 20 weight percent of styrene and from about 65 to about 80 weight percent of butadiene. In such a three domain polymer, one domain forms from about 5 to about 25, preferably from about 10 to about 20, weight percent of the polymer and comprises from about 10 to 45, preferably from about 30 to about 45 weight percent of acrylonitrile, from 0 to about 30, preferably from 0 to about 15, weight percent of styrene and from about 40 to about 60, preferably from about 50 to about 55, weight percent of butadiene. A second domain forms from about 30 to about 70, preferably from about 45 to about 55, weight percent of the polymer and comprises from 0 to about 10, preferably from about 3 to about 7, weight percent of acrylonitrile, from 0 to about 15, preferably from about 3 to 8, weight percent of styrene and from about 80 to about 95, preferably from about 85 to about 90, weight percent of butadiene. The third domain forms from about 5 to about 65, preferably from about 25 to about 45, weight percent of the polymer and comprises from 0 to about 20, preferably from 0 to about 10, weight percent of acrylonitrile, from about 5 to about 45, preferably from about 15 to about 45, weight percent of styrene and from about 55 to about 80, preferably from about 55 to about 75, weight percent of butadiene. For either of the polymer having two or three domains, one or more domain may also include a copolymerizable ethylenically unsaturated carboxylic acid such as acrylic acid, methacrylic acid, fumaric acid or maleic acid replacing a portion of the butadiene. The quantity of such unsaturated carboxylic acid is from about 0.5 to about 5 weight percent. Preferably, such an unsaturated carboxylic acid is a dicarboxylic acid selected from fumaric and maleic acid and is mainly present in the domain having the highest acrylonitrile content with lesser proportions being present in the other domains.

Such two domain and three domain polymers may be made by the process as described in U.S. Pat. No. 5,237,015 by the emulsion free radical polymerization process using two or three consecutive stages wherein the monomers provided at each stage are at such concentrations and in such ratios as to yield the desired composition for that stage. Because the polymerization is undertaken in two or three consecutive stages, the first stage yields the first domain and the second and third stages yield the second domain which is formed in the presence of the polymer containing the first domain and the third domain which is formed in the presence of the polymer containing the first and second domains. Such emulsion free radical polymerization is well known in the art and requires the monomer(s) to be dispersed in water containing one or more emulsifiers, other ingredients such as chain transfer agents, chelating agents, etc. added and one or more free radical polymerization catalyst system added, the mixture being agitated at a controlled temperature for the appropriate time to yield the polymer in latex form. When the last domain has been formed the latex is subjected to the conventional stripping, coagulation and drying processes to yield the dry polymer.

Silica mixed with the polymer is the well known fine particle size silica which is readily commercially available. The amount of silica to be mixed with the polymer is from about 30 to about 75, preferably from about 40 to about 60, parts by weight per 100 parts by weight of polymer when silica is the only filler used. When silica and carbon black are both used as filler, the amount of silica is from about 10 to about 60 parts by weight per 100 parts by weight of polymer and the amount of carbon black is from about 5 to about 60 parts by weight per 100 parts by weight of polymer with the proviso that the total amount of silica plus carbon black is not more than about 75 parts by weight per 100 parts by weight of polymer and that the weight ratio of silica to carbon black is from 1 to 4 to 6 to 1. Suitable types of carbon black include the well known furnace carbon blacks.

The polyfunctional polysulphide silane compound is selected from among those compounds which are known to improve the interaction of silica with polymer. Such compounds include those known as silane coupling agents which contain silicon and sulphur such as the mercaptosilanes, the polysulphide silanes and the alkyl- or alkyloxy-silyl polysulphides, such as bis(3-[triethoxysilyl]propyl) tetrasulphide. Many of such compounds are provided as a mixture with an inert material, for example as a mixture with carbon black such that the mixture contains about 50 percent of the polysulphide silane compound and 50 percent (by weight) of carbon black. The quantity of such polysulphide silane compound as commercially available is from about 1 to about 5, preferably from about 1.5 to about 3, parts by weight per 100 parts by weight of polymer. The polysulphide silane compound is added at the same time that the silica is added during the mixing (compounding) stage.

The sulphur-based vulcanization agents are well known in the industry. Suitable components include elemental sulphur, thiuram sulphides, thiuram disulphides, thiocarbamates, sulphenamides, guanidines and the like. The quantities used are typical of the usage in the industry and range from about 0.5 up to about 2 parts by weight per 100 parts by weight of polymer for any one or more of the components. Other conventional compounding ingredients such as extender oils, especially the highly aromatic extender oils, stearic acid, zinc oxide and the like may also be added to the mixture.

The process of mixing the components is well known in the industry. The components may be mixed on a rubber mill but preferably are mixed in an internal mixer such as a Banbury mixer. The polymer or polymers is usually added first to a mixer at a temperature of about 70° to 80° C., followed by a portion of the filler or fillers, followed by the remaining filler or fillers plus the polyfunctional polysulphide silane compound plus zinc oxide and stearic acid. The mixing is continued usually for a set period of time, at which time the temperature of the mixture is usually above about 150° C. and may be up to about 170° C., following which it is dumped and cooled. The sulphur-based vulcanization agents are added to the cooled mixture on a rubber mill usually at a temperature of from about 70° to about 100° C. The so-formed mixture is then shaped, such as by extrusion or molding, and the shaped mixture is then vulcanized by heating for about 5 to about 60 minutes at a temperature of from about 150° to about 200° C.

The vulcanizates are tested by the standard procedures well known in the rubber industry including testing in a Monsanto rheometer (ASTM D 2084), tear testing using Die B, Zwick rebound at 0°, 23° and 70° C. or 100° C., compression set after 25% deflection for 22 or 70 hours at 70° C., NBS abrasion, DIN abrasion and dynamic property testing using a Rheometrics analyzer model RSA II which was used to measure the complex modulus E*, the storage modulus E' and the loss modulus E" at a constant frequency of 11 HZ in the temperature sweep mode at an amplitude of 0.05%. From the dynamic modulus results, tan delta (E"/E') may be calculated. It is generally believed that a low value of tan delta in the 60° C. region is desirable for a tire tread having low rolling resistance and a high value of tan delta in the 0° C. region is desirable for a tire tread having good wet traction.

We have found that good strength and flexibility and good rolling resistance and wet traction are obtained when rubbery vulcanizates containing the rubbery polymer herein defined are prepared according to the process described using silica alone or in combination with carbon black as the filler.

The following examples illustrate but do not limit the invention.

EXAMPLE 1

For this Example, the following polymers were used:

Polymer #1 commercial SBR (KRYLENE® 1500), (23 wt. % styrene)

Polymer #2 experimental 3 domain SNBR (10 wt. % acrylonitrile, 25 wt. % styrene, 65 wt. % butadiene overall; weight ratio of phases 20-25-55; first phase 43 wt. % acrylonitrile, 57 wt. % butadiene; second phase 6 wt. % acrylonitrile, 4 wt. % styrene, 90 wt. % butadiene; third phase 43 wt. % styrene, 57 wt. % butadiene).

Polymer #3 experimental 2 domain SNBR (24 wt. % acrylonitrile, 7 wt. % styrene, 69 wt. % butadiene overall; weight ratio of phases 50—50; first phase 20 wt. % acrylonitrile, 14 wt. % styrene, 66 wt. % butadiene; second phase 30 wt. % acrylonitrile, 70 wt. % butadiene).

Polymer #4 experimental 3 domain SNBR (9 wt. % acrylonitrile, 15 wt. % styrene, 76 wt. % butadiene overall; weight ratio of phases 15-50-35; first phase 43 wt. % acrylonitrile, 57 wt. % butadiene; second phase 5 wt. % acrylonitrile, 95 wt. % butadiene; third phase 43 wt. % styrene, 57 wt. % butadiene).

Polymer #5 experimental random SNBR, (20 wt. % acrylonitrile, 15 wt. % styrene, 65 wt. % butadiene).

Polymers #2 to 5 inclusive were produced by emulsion free radical polymerization in a pilot plant scale of operation. Polymers #1 and 5 are controls. The carbon black used was N339, the silica was HISIL® 233, the oil was a highly aromatic oil SUNDEX® 790, the polyfunctional polysulphide silane was SILANE®X-50-S which is a mixture of the silane (50 percent by weight) and carbon black (50 percent by weight), accelerator-1 was benzothiazyl-2-butyl-sulphenamide (VULKACIT®NZ/EGC) and accelerator-2 was diphenyl guandine (VULKACIT®D/C)—details are provided in Table I together with the vulcanization characteristics as determined on the Monsanto Rheometer. Table II provides the properties of the vulcanizates. For the dynamic properties, E* is the complex modulus, E' is the storage modulus, E" is the loss modulus and Tan delta is the loss factor E"/E'. The tan delta-temperature curve has one or more peaks and these are shown at the temperature at which such peaks occur and the value of tan delta at such temperature.

Experiments #1, 2, 9 and 10 are controls by virtue of the use of the polymers defined. Experiments #3, 5 and 7 are controls by virtue of the use of only carbon black as the filler. The overall balance of properties for the Experiments according to the invention is readily seen to be as good as or better than those for the controls.

EXAMPLE 2

The polymer used was the experiment polymer identified as Polymer #4 in Example 1. The compounding procedure and components were the same as in Example 1 as were also the evaluation procedures. The compound recipe and the vulcanization characteristics are given in Table III and the vulcanization properties are given in Table IV. Antioxidant-1 was polymerized 2,2,4-trimethyl-1, 2-dihydroquinoline (FLECTOL®H), antioxidant-2 was N-phenyl-N$^1$(1,3-methylbutyl)-p-phenylenediamine (SANTOFLEX® 13) and wax was a solid, pure re-refined paraffin wax. Experiment #21 is a control, by virtue of using only carbon black as the filler. The data show that the use of mixtures of carbon black and silica and the silica alone provides vulcanizates having a useful balance of properties.

EXAMPLE 3

The polymers used were Polymer #4 (of Example 1) and Polymer #6 which is a high cis-1,4-polybutadiene (TAKTENE® 1203). All other materials were as described in Example 1 and 2. The compound recipe and the vulcanization characteristics are given in Table V and the vulcanizate properties are given in Table VI. The improved balance of vulcanizate properties is seen when the polymer having two or three domains is combined with a high cis-1,4-polybutadiene.

TABLE I

| | Expt. # | | | | | | | | | |
|---|---|---|---|---|---|---|---|---|---|---|
| | 1 | 2 | 3 | 4 | 5 | 6 | 7 | 8 | 9 | 10 |
| Polymer # | 1 | 1 | 2 | 2 | 3 | 3 | 4 | 4 | 5 | 5 |
| Wt. of Polymer | | | | | 100 | | | | | |
| Wt. of Black | 50 | 5 | 50 | 5 | 50 | 5 | 50 | 5 | 50 | 5 |
| Wt. of Silica | — | 50 | — | 50 | — | 50 | — | 50 | — | 50 |
| Wt. of Stearic Acid | | | | | 1.5 | | | | | |
| Wt. of Zinc Oxide | | | | | 3 | | | | | |
| Wt. of Oil | | | | | 5 | | | | | |
| Wt. of Silane Compound | — | 2 | — | 2 | — | 2 | — | 2 | — | 2 |
| Wt. of Sulphur | | | | | 1.75 | | | | | |
| Wt. of Accelerator-1 | 1 | 1.8 | 1 | 1.8 | 1 | 1.8 | 1 | 1.8 | 1 | 1.8 |
| Wt. of Accelerator-2 | — | 2 | — | 2 | — | 2 | — | 2 | — | 2 |
| Vulcanization Characteristics (1.7 Hz (100 cpm), 160° C., 1° arc) | | | | | | | | | | |
| MH (dN · m) | 46.6 | 49.5 | 33.3 | 45 | 40.1 | 52.9 | 37.6 | 47.1 | 39.5 | 49 |
| ML (dN · m) | 9.3 | 10.8 | 10.9 | 13 | 8.1 | 9.6 | 12.7 | 13.6 | 8.6 | 8.4 |
| t90 (mins) | 19.1 | 12.8 | 9.6 | 15.4 | 7.6 | 8.3 | 8 | 9.7 | 10 | 9.9 |

TABLE II

| | Expt. # | | | | | | | | | |
|---|---|---|---|---|---|---|---|---|---|---|
| | 1 | 2 | 3 | 4 | 5 | 6 | 7 | 8 | 9 | 10 |
| Stress-strain properties Cure $t_{90}$ + 5 mins at 160° C. | | | | | | | | | | |
| 100% Modulus (MPa) | 3.4 | 3 | 3.2 | 3.4 | 3.7 | 3.7 | 3.2 | 3.3 | 4.1 | 3.9 |
| 300% Modulus (MPa) | 18.1 | 13.6 | 14.3 | 13.3 | 19.3 | — | 16.4 | — | 20.1 | 17.8 |
| Tensile strength (MPa) | 28.5 | 24.6 | 15.8 | 16.9 | 21.7 | 17.4 | 19.4 | 14 | 23.3 | 20.9 |
| Elongation (%) | 450 | 430 | 325 | 355 | 330 | 295 | 340 | 275 | 350 | 335 |
| Tear Strength (Die B) Cure $t_{90}$ + 5 mins at 160° C. | | | | | | | | | | |
| (kNm) | 100.6 | 80.1 | 66.6 | 63.3 | 83.7 | 72.5 | 58.6 | 68 | 85.6 | 84.1 |
| Zwick Rebound - Cure t90 + 10 mins at 160° C. | | | | | | | | | | |
| 0° C., (%) | 28 | 28 | 14 | 18 | 11 | 8 | 21 | 23 | 12 | 10 |
| 23° C., (%) | 42 | 46 | 27 | 23 | 28 | 28 | 36 | 33 | 27 | 26 |
| 100° C., (%) | 59 | 67 | 47 | 55 | 50 | 61 | 51 | 59 | 46 | 60 |
| Compression Set - Cure t90 + 10 mins at 160° C.; deflection 25%, 70 hours at 70° C. | | | | | | | | | | |
| (%) | 27 | 23 | 38 | 30 | 31 | 34 | 40 | 32 | 28 | 30 |
| NBS Abrasion - Cure t90 + 10 mins at 160° C. | | | | | | | | | | |
| (%) | 161 | 181 | 175 | 142 | 298 | 183 | 241 | 199 | 235 | 151 |
| DIN Abrasion - Cure t90 + 10 mins at 160° C. | | | | | | | | | | |
| (mm$^3$) | 94 | 108 | 144 | 155 | 101 | 122 | 105 | 109 | 107 | 127 |
| Dynamic Properties - Cure t90 + 5 mins at 160° C. Measured at 0° C. | | | | | | | | | | |
| E$^x$ (MPa) | 24.7 | 13.6 | 49.4 | 85.6 | 42.4 | 39.8 | 29.7 | 39.9 | 104.5 | 127.6 |
| E$^1$ (MPa) | 24.4 | 13.4 | 44.8 | 83.2 | 39.1 | 35.5 | 28.2 | 39.0 | 82.0 | 94.2 |
| E$^{11}$ (MPa) | 3.7 | 2.6 | 20.3 | 21.3 | 16.1 | 17.7 | 8.8 | 9.7 | 63.2 | 86.2 |
| Tan delta | 0.152 | 0.196 | 0.45 | 0.256 | 0.412 | 0.496 | 0.311 | 0.25 | 0.761 | 0.916 |
| Measured at 60° C. | | | | | | | | | | |
| E$^x$ (MPa) | 10.0 | 8.0 | 9.0 | 10.7 | 10.5 | 11.8 | 8.8 | 8.8 | 10.5 | 11.5 |
| E$^1$ (MPa) | 9.9 | 8.0 | 8.8 | 10.6 | 10.3 | 11.8 | 8.7 | 8.8 | 10.4 | 11.5 |
| E$^{11}$ (MPa) | 1.3 | 0.7 | 1.5 | 1.4 | 1.7 | 1.3 | 1.5 | 1.0 | 1.8 | 1.2 |
| Tan delta | 0.13 | 0.092 | 0.175 | 0.127 | 0.168 | 0.109 | 0.173 | 0.11 | 0.174 | 0.105 |
| Peaks in tan delta-temperature curve | | | | | | | | | | |
| T1 (°C.) | −34.1 | −31.1 | −29.3 | −28.8 | −11.5 | −9.8 | −35.2 | −34.4 | −3.2 | 0.4 |

TABLE II-continued

| | Expt. # | | | | | | | | | |
|---|---|---|---|---|---|---|---|---|---|---|
| | 1 | 2 | 3 | 4 | 5 | 6 | 7 | 8 | 9 | 10 |
| Tan delta at T1 | 0.74 | 0.975 | 0.40 | 0.46 | 0.748 | 0.765 | 0.484 | 0.507 | 0.837 | 0.92 |
| T2 (°C.) | — | — | −1.7 | 8.5 | — | — | −2.7 | 4.8 | — | — |
| Tan delta at T2 | | | 0.469 | 0.399 | | | 0.341 | 0.323 | | |

TABLE III

| | Expt. # | | | | | |
|---|---|---|---|---|---|---|
| | 21 | 22 | 23 | 24 | 25 | 26 |
| Wt. of Polymer | | | 100 | | | |
| Wt. of Black | 75 | 60 | 45 | 30 | 15 | 0 |
| Wt. of Silica | 0 | 15 | 30 | 45 | 60 | 75 |
| Wt. of Antioxidant-1 | | | 0.6 | | | |
| Wt. of Wax | | | 1.2 | | | |
| Wt. of Antioxidant-2 | | | 1.2 | | | |
| Wt. of Stearic Acid | | | 1.9 | | | |
| Wt. of Zinc Oxide | | | 1.9 | | | |
| Wt. of Oil | | | 34 | | | |
| Wt. of Silane Compound | 0 | 2 | 2 | 2 | 2 | 2 |
| Wt. of Sulphur | | | 1.74 | | | |
| Wt. of Accelerator-1 | | | 1.8 | | | |
| Wt. of Accelerator-2 | 0.12 | 2 | 2 | 2 | 2 | 2 |
| Vulcanization Characteristics (1.7 Hz (100 cpm), 160° C., 1° arc) | | | | | | |
| MH (dN · m) | 27.9 | 31.2 | 30.7 | 34.1 | 38.6 | 43 |
| ML (dN · m) | 11.2 | 7.1 | 6.5 | 8.6 | 9.8 | 12.2 |
| t90 (mins) | 17.7 | 11.4 | 13 | 15.2 | 17.4 | 21 |

TABLE IV

| | Expt. # | | | | | |
|---|---|---|---|---|---|---|
| | 21 | 22 | 23 | 24 | 25 | 26 |
| Stress-strain Properties Cure $t_{90}$ + 5 mins at 160° C. | | | | | | |
| 100% Modulus (MPa) | 2.1 | 2.5 | 2.3 | 2.1 | 1.8 | 1.6 |
| 300% Modulus (MPa) | 9.8 | 11.8 | 10.1 | 8.3 | 6.2 | 4.8 |
| Tensile strength (MPa) | 16.8 | 16.8 | 15.6 | 15.0 | 14.7 | 13.3 |
| Elongation (%) | 470 | 380 | 420 | 465 | 560 | 620 |
| Tear Strength (Die B) Cure $t_{90}$ + 5 mins at 160° C. | | | | | | |
| (kNm) | 64.2 | 62.2 | 60.2 | 62.6 | 61.5 | 65.1 |
| Zwick Rebound - Cure t90 + 10 mins at 160° C. | | | | | | |
| 0° C., (%) | 14.6 | 16 | 16 | 17 | 19 | 22 |
| 23° C., (%) | 23.3 | 20 | 20 | 22 | 25 | 31 |
| 100° C., (%) | 33.3 | 43 | 44 | 45 | 45 | 47 |
| Compression Set-Cure $t_{90}$ + 10 mins at 160° C.; deflection 25%, 70 hours at 70° C. | | | | | | |
| (%) | 27 | 39 | 40 | 34 | 39 | 43 |
| NBS Abrasion - Cure $t_{90}$ + 10 mins at 160° C. | | | | | | |
| Index (%) | 1097 | 1412 | 1514 | 1745 | 1008 | 801 |
| DIN Abrasion - Cure $t_{90}$ + 10 mins at 160° C. | | | | | | |
| Loss (mm³) | 157 | 134 | 168 | 182 | 222 | 278 |
| Measured at 0° C. Dynamic Properties Cure $t_{90}$ + 5 mins at 160° C. | | | | | | |
| E* (MPa) | 72.7 | 99.4 | 94.5 | 99.4 | 99.7 | 71.2 |
| E' (MPa) | 69.7 | 97.7 | 93.2 | 98.1 | 98.6 | 70.1 |
| E" (MPa) | 20.6 | 19.3 | 18.4 | 17.2 | 17 | 13.2 |
| Tan delta | 0.296 | 0.198 | 0.199 | 0.176 | 0.173 | 0.189 |

TABLE IV-continued

| | Expt. # | | | | | |
|---|---|---|---|---|---|---|
| | 21 | 22 | 23 | 24 | 25 | 26 |
| Measured at 60° C. | | | | | | |
| E* (MPa) | 11.9 | 11.6 | 10.1 | 14.4 | 20.7 | 17.7 |
| E' (MPa) | 11.7 | 11.5 | 10 | 14.3 | 20.6 | 17.6 |
| E" (MPa) | 2.2 | 1.7 | 1.6 | 1.8 | 2.1 | 1.5 |
| Tan delta | 0.19 | 0.15 | 0.155 | 0.126 | 0.1 | 0.087 |
| Peaks in tan delta - temperature curve | | | | | | |
| T1 (°C.) | −35.2 | −33.3 | −33.2 | −33.3 | −33.7 | −35.1 |
| Tan delta at T1 | 0.37 | 0.377 | 0.38 | 0.387 | 0.415 | 0.453 |
| T2 (°C.) | −1.2 | 9.9 | 8.6 | 8.7 | 8.3 | 7 |
| Tan delta at T2 | 0.299 | 0.318 | 0.354 | 0.314 | 0.277 | 0.26 |

TABLE V

| | Expt. # | | | |
|---|---|---|---|---|
| | 31 | 32 | 33 | 34 |
| Wt. of Polymer #4 | 80 | 80 | 80 | 80 |
| Wt. of Polymer #6 | 20 | 20 | 20 | 20 |
| Wt. Black | 75 | 45 | 30 | 0 |
| Wt. of Silica | 0 | 30 | 45 | 75 |
| Wt. of Antioxidant-1 | | 0.6 | | |
| Wt. of Wax | | 1.2 | | |
| Wt. of Antioxidant-2 | | 1.2 | | |
| Wt. of Stearic Acid | | 1.9 | | |
| Wt. of Zinc Oxide | | 3 | | |
| Wt. of Oil | | 34 | | |
| Wt. of Silane Compound | | 2 | | |
| Wt. of Sulphur | | 1.75 | | |
| Wt. of Accelerator-1 | | 1.8 | | |
| Wt. of Accelerator-2 | | 2 | | |
| Vulcanization Characteristics (1.7 Hz (100 cpm), 160° C., 1° arc) | | | | |
| MH (dN · m) | 38.5 | 39 | 41.8 | 48.5 |
| ML (dN · m) | 10.1 | 8 | 9.7 | 20.2 |
| t90 (mins) | 7.9 | 7.8 | 9 | 15.8 |

TABLE VI

| | Expt. # | | | |
|---|---|---|---|---|
| | 31 | 32 | 33 | 34 |
| Stress-strain properties Cure $t_{90}$ + 5 mins at 160° C. | | | | |
| 100% Modulus (MPa) | 3.1 | 2.6 | 2.2 | 1.7 |
| 300% Modulus (MPa) | 12.5 | 11.1 | 8.9 | 5.3 |
| Tensile strength (MPa) | 17.2 | 16.5 | 15.9 | 15.5 |
| Elongation (%) | 390 | 420 | 450 | 670 |
| Tear Strength (Die B) | | | | |
| (kNm) | 64.1 | 68.1 | 65.6 | 61.9 |
| Zwick Rebound - cure $t_{90+10}$ mins at 160° C. | | | | |
| 0° C., (%) | 17 | 19 | 20 | 25 |

TABLE VI-continued

|  | Expt. # | | | |
|---|---|---|---|---|
|  | 31 | 32 | 33 | 34 |
| 23° C., (%) | 23 | 23 | 25 | 34 |
| 70° C., (%) | 41 | 45 | 45 | 47 |
| Compression set-Cure $t_{90}$ + 10 mins @ 160° C.-deflection 25%, 24 hours @ 70° C. | | | | |
| (%) | 31 | 26 | 18 | 29 |
| NBS Abrasion - Cure $t_{90}$ + 10 mins at 160° C. | | | | |
| Index (%) | 2446 | 1946 | 2893 | 129 |
| DIN Abrasion - Cure $t_{90}$ + mins at 160° C. | | | | |
| Loss (mm³) | 113 | 100 | 108 | 144 |
| Dynamic Properties - Cure $t_{90}$ + 5 mins at 160° C. Measured at 0° C. | | | | |
| E* (MPa) | 93.1 | 87.1 | 99.1 | 42 |
| E' (MPa) | 92.2 | 86.1 | 98.1 | 41.9 |
| E" (MPa) | 18.5 | 13.6 | 14.4 | 8.1 |
| Tan delta | 0.202 | 0.158 | 0.147 | 0.197 |
| Measured at 60° C. | | | | |
| E* (MPa) | 14.6 | 14.4 | 18.4 | 12 |
| E' (MPa) | 14.4 | 14.3 | 18.3 | 12 |
| E" (MPa) | 2.1 | 1.8 | 2 | 1.2 |
| Tan delta | 0.146 | 0.124 | 0.111 | 0.101 |
| Peaks in tan delta - temperature curve | | | | |
| T1 (°C.) | −82.7 | −84.2 | −86.6 | −86.5 |
| Tan delta at T1 | 0.046 | 0.049 | 0.046 | 0.058 |
| T2 (°C.) | −35.6 | −35.4 | −35.1 | −33.4 |
| Tan delta at T2 | 0.306 | 0.363 | 0.361 | 0.448 |
| T3 (°C.) | 6.4 | 9.4 | 9.7 | 6.2 |
| Tan delta at T3 | 0.273 | 0.296 | 0.268 | 0.244 |

What is claimed is:

1. A process for making a rubbery vulcanizate having an improved balance of properties which process comprises preparing a mixture comprising rubbery polymer, filler selected from silica and from silica and carbon black, a polyfunctional polysulphide silane compound and sulphur-based vulcanization agents, shaping said mixture and vulcanizing the shaped mixture by heating, wherein said rubbery polymer is selected from a polymer having two or three domains and from a mixture containing per 100 parts by weight from about 20 to about 85 parts by weight of a polymer having two or three domains and from about 15 to about 80 parts by weight of a polymer selected from polybutadiene having a cis-1,4 content of from 90 to about 99 weight percent, a styrene-butadiene polymer having from about 17 to about 25 weight percent of bound styrene, natural rubber, or a mixture of said polybutadiene and a minor proportion of natural rubber, said polymer having two or three domains comprising for the two domain polymer from about 5 to about 30 weight percent of acrylonitrile, from about 5 to about 40 weight percent of styrene and from about 55 to about 85 weight percent of butadiene and wherein one domain forms from about 10 to about 70 weight percent of the polymer and comprises from about 5 to about 45 weight percent of acrylonitrile, from about 5 to about 50 weight percent of styrene and from about 50 to about 75 weight percent of butadiene and wherein a second domain forms from about 30 to about 90 weight percent of the polymer and comprises from about 10 to about 45 weight percent of acrylonitrile, from 0 to about 50 weight percent of styrene and from about 50 to about 90 weight percent of butadiene and for the three domain polymer from about 5 to about 20 weight percent of acrylonitrile, from about 5 to about 30 weight percent of styrene and from about 50 to about 80 weight percent of butadiene and wherein one domain forms from about 5 to about 25 weight percent of the polymer and comprises from about 10 to about 45 weight percent of acrylonitrile, from 0 to about 30 weight percent of styrene and from about 40 to about 60 weight percent of butadiene, a second domain forms from about 30 to about 70 weight percent of the polymer and comprises from 0 to about 10 weight percent of acrylonitrile, from 0 to about 15 weight percent of styrene and from about 80 to about 95 weight percent of butadiene, and a third domain forms from about 5 to about 65 weight percent of the polymer and comprises from 0 to about 20 weight percent of acrylonitrile, from about 5 to about 45 weight percent of styrene and from about 55 to about 80 weight percent of butadiene, wherein the quantity of filler per 100 parts by weight of rubbery polymer is from greater than 40 to about 75 parts by weight of silica or from greater than 40 to about 60 parts by weight of silica plus from about 5 to about 60 parts by weight of carbon black the total amount of silica plus carbon black not being more than 75 parts by weight and the weight ratio of silica to carbon black being within the range of 1 to 4 to 6 to 1 and the carbon black being a furnace carbon black.

2. The process of claim 1 wherein the rubbery polymer is a mixture containing per 100 parts by weight from about 30 to about 50 parts by weight of a polymer having two or three domains and from about 50 to about 70 parts by weight of polybutadiene or a mixture of polybutadiene and natural rubber wherein the natural rubber forms about 10 to about 30 weight percent of the mixture of polybutadiene and natural rubber.

3. The process of claim 1 wherein the polymer has two domains and comprises from about 10 to about 25 weight percent of acrylonitrile, from about 5 to about 25 weight percent of styrene and from about 65 to about 80 weight percent of butadiene and wherein one domain forms from about 15 to about 50 weight percent of the polymer and comprises from about 15 to about 45 weight percent of acrylonitrile, from about 5 to about 30 weight percent of styrene and from about 55 to about 65 weight percent of butadiene and wherein a second domain forms from about 50 to about 85 weight percent of the polymer and comprises from about 10 to about 30 weight percent of acrylonitrile, from 0 to about 30 weight percent of styrene and from about 55 to about 80 weight percent of butadiene.

4. The process of claim 1 wherein the polymer has three domains and comprises from about 8 to about 15 weight percent of acrylonitrile, from about 10 to about 20 weight percent of styrene and from about 65 to about 80 weight percent of butadiene and wherein one domain forms from about 10 to about 20 weight percent of the polymer and comprises from about 30 to about 45 weight percent of acrylonitrile, from 0 to about 15 weight percent of styrene and from about 50 to about 55 weight percent of butadiene, a second domain forms from about 45 to about 55 weight percent of the polymer and comprises from about 3 to about 7 weight percent of acrylonitrile, from about 3 to about 8 weight percent of styrene and from about 85 to about 90 weight percent of butadiene, and a third domain forms from about 25 to about 45 weight percent of the polymer and comprises from 0 to about 10 weight percent of acrylonitrile, from about 15 to about 45 weight percent of styrene and form about 55 to about 75 weight percent of butadiene.

5. The process of claim 1 wherein the filler is silica in an amount of from about 40 to about 60 parts by weight per 100 parts by weight of polymer.

6. The process of claim 1 wherein the filler is silica and carbon black.

7. The process of claim 1 wherein the polysulphide silane compound is added to the mixture with the silica and is present in an amount of from about 1 to about 5 parts by weight per 100 parts by weight of polymer.

8. The process of claim 1 wherein the shaped mixture is vulcanized by heating for about 5 to about 60 minutes at a temperature of from about 150° to about 200° C.

* * * * *